No. 705,602. Patented July 29, 1902.
H. NEILSON.
BROOM.
(Application filed Nov. 28, 1899.)
(No Model.)
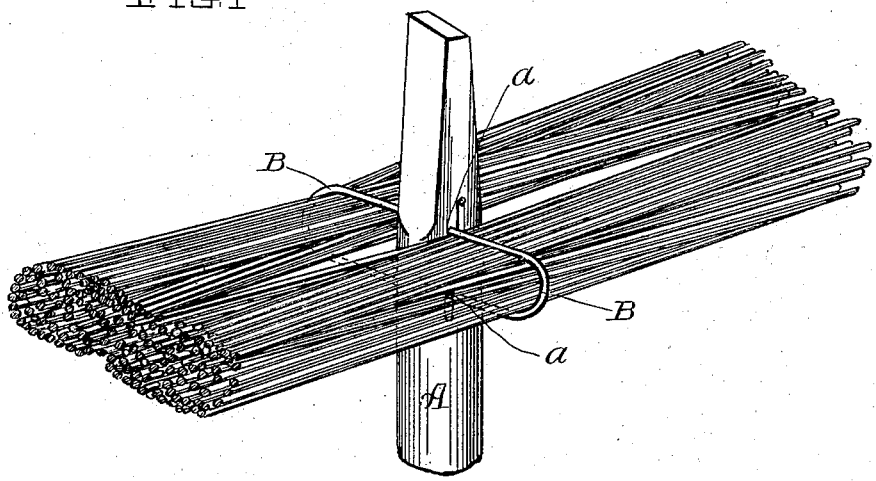
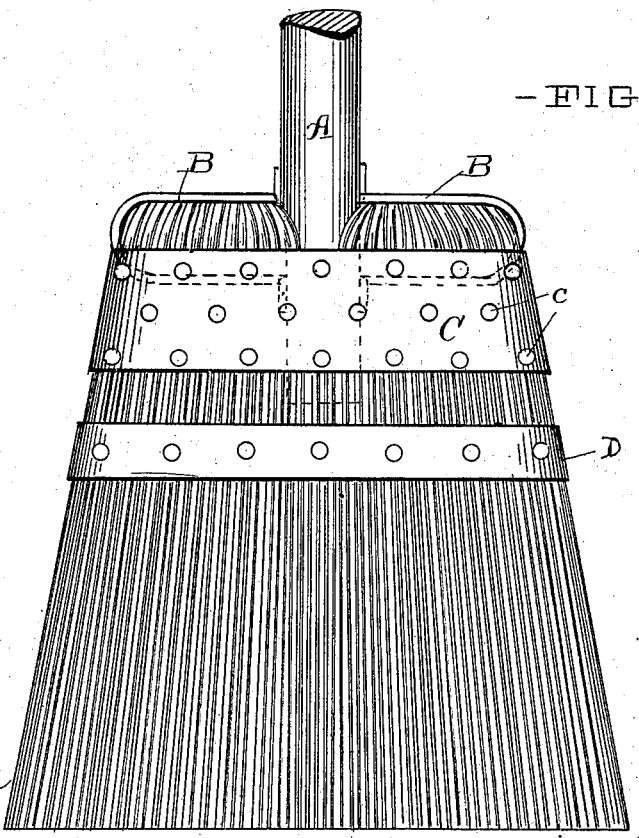
Witnesses,
J. C. Turner
N. C. Merkel
Inventor
H. Neilson
By J. D. Fay, Atty

UNITED STATES PATENT OFFICE.

HENRY NEILSON, OF CLEVELAND, OHIO, ASSIGNOR TO THE OSBORN MANUFACTURING COMPANY, OF CLEVELAND, OHIO, A CORPORATION OF OHIO.

BROOM.

SPECIFICATION forming part of Letters Patent No. 705,602, dated July 29, 1902.

Application filed November 28, 1899. Serial No. 738,542. (No model.)

*To all whom it may concern:*

Be it known that I, HENRY NEILSON, a subject of the King of Denmark, and a resident of Cleveland, county of Cuyahoga, and State of Ohio, have invented a new and useful Improvement in Brooms, of which the following is a specification, the principle of the invention being herein explained and the best mode in which I have contemplated applying that principle, so as to distinguish it from other inventions.

My invention relates to brooms, and particularly to that class of brooms wherein heavy or stiff bristles are utilized; and it consists of a structure hereinafter fully described.

The annexed drawings and the following description set forth in detail certain means embodying the invention, such disclosed means constituting but one of various forms in which the principle of the invention may be used.

In said annexed drawings, Figure I represents the broom structure as assembled prior to its completion, and Fig. II represents a completed broom.

A handle A, preferably tapered at one end, is provided near said end with two holes *a a*, which pierce it transversely, as shown. Two staples B B respectively pass through said holes from each side and are clenched on the side opposite, whereby they are rigidly secured against displacement in a direction opposite that of their insertion and in the direction of the handle-axis, thereby forming two laterally-extending loops. Through each loop formed by said staples is passed a bunch of the bristles to be used of equal weight and sufficient quantity to properly fill said loops, as shown in Fig. I, which are thereupon bent so as to lie substantially parallel with the handle-axis and in the direction of the short or tapered end. After being so bent the bristles are suitably spread and securely bound intermediately of their bent portions and ends near the loops by means of a sheet-metal strap C, which is secured in place by rivets *c*, passing completely through the broom-body and both sides of the said strap, the tapered end thereby extending into said body and opposite said strap, as shown in Fig. II. A second strap D is preferably secured intermediately of the strap C and the lower extremities of the broom-bristles, as shown.

Arranged as above described my improved broom is of economical structure and of great durability. The upper portion of each loop acts as a back and prevents the stiff bristles from being pushed out and displaced. The handle extending into the body, as shown, effects rigidity as between the handle and broom-body, and the bristles themselves prevent the displacement of the staples in the direction of their insertion.

The entire structure is hence bound into one of absolute rigidity and great strength.

Other modes of applying the principle of my invention may be employed instead of the one explained, change being made as regards the means herein disclosed, provided the means covered by the following claim be employed.

I therefore particularly point out and distinctly claim as my invention—

A broom consisting of a handle provided near one end with two holes piercing it transversely, two staples passing respectively from each side through said holes and secured, bent bristles passing through said staples and bound intermediately of their bent portions and ends, substantially as set forth.

Signed by me this 25th day of November, 1899.

HENRY NEILSON.

Attest:
D. T. DAVIES,
A. E. MERKEL.